United States Patent [19]

Lamberts et al.

[11] Patent Number: 5,428,077
[45] Date of Patent: Jun. 27, 1995

[54] PROCESS FOR PRODUCING ISOCYANATE-BASED FOAMS

[75] Inventors: Wilhelm Lamberts, Leverkusen; Werner Dietrich, Odenthal, both of Germany

[73] Assignee: Bayer Aktiengesellschaft, Leverkusen, Germany

[21] Appl. No.: 344,208

[22] Filed: Nov. 8, 1994

Related U.S. Application Data

[63] Continuation of Ser. No. 194,188, Feb. 9, 1994, abandoned.

[30] Foreign Application Priority Data

Feb. 10, 1993 [DE] Germany .................. 43 03 886.7
Aug. 24, 1993 [DE] Germany .................. 43 28 383.7

[51] Int. Cl.$^6$ .............................................. C08G 18/00
[52] U.S. Cl. ................................. 521/131; 521/174; 521/176; 521/914
[58] Field of Search ................ 521/131, 174, 176, 914

[56] References Cited

U.S. PATENT DOCUMENTS

| | | | |
|---|---|---|---|
| 3,072,582 | 1/1963 | Frost | 260/2.5 |
| 4,585,807 | 4/1986 | Christman | 521/167 |
| 5,096,933 | 3/1992 | Volkert | 521/131 |
| 5,182,309 | 1/1993 | Hützen | 521/99 |

FOREIGN PATENT DOCUMENTS 2544560 4/1977 Germany .
9216573 10/1992 WIPO .

*Primary Examiner*—Morton Foelak
*Attorney, Agent, or Firm*—Joseph C. Gil

[57] ABSTRACT

Isocyanate-based foams are produced by the reaction of polyisocyanates with compounds with molecular weights of from 400 to 10,000 and having at least two hydrogen atoms active towards isocyanates in the presence of hydrocarbons which are vaporizable under the foaming conditions as blowing agents. The active hydrogen component is a mixture of a) one or more nitrogen-free polyethers having at least two hydrogen atoms active towards isocyanates and containing oxyethylene residues, and b) one or more polyethers having at least two hydrogen atoms active towards isocyanates and containing no oxyethylene groups.

10 Claims, No Drawings

PROCESS FOR PRODUCING ISOCYANATE-BASED FOAMS

This application is a continuation of application Ser. No. 08/194,188 filed Feb. 9, 1994, now abandoned.

BACKGROUND OF THE INVENTION

The present invention relates to the production of isocyanate-based foams using hydrocarbons which are vaporizable under foaming conditions as blowing agents. Preferred are those hydrocarbons with boiling points of 10° to 80° at 760 mm Hg, and specified polyether-polyol mixtures in which the hydrocarbon being used as a blowing agent is partly dissolved and partly dispersed, so that an emulsion is formed.

It is well known that isocyanate-based foams can be produced using such hydrocarbons as blowing agents (see, e.g. U.S. Pat. Nos. 3,072,582 and 4,585,807, European Patents 394,769 and 421,269, and German Offenlegeschrift 2,544,560). In closed-cell foamed materials, such blowing agents are efficient as heat insulating cell gases. However, to date, the chlorofluorocarbons (such as trichlorofluoromethane (R 11), dichlorodifluoromethane (R 12) and trichloro-fluoroethane (R 13)) are the insulating and foaming gases most widely used for foamed materials made of polyurethane, polystyrene, polyvinyl chloride, phenol-formaldehyde and the like.

The chlorofluorocarbon blowing agents have the disadvantage that they enter the stratosphere, where they are thought to contribute to the breakdown of the ozone present by reason of their chlorine content. Because of this there are plans to cease the production of chlorofluorocarbons in the near future.

Among the blowing agents which do not have the above disadvantages are hydrocarbons which are vaporizable under foaming conditions, such as n- and iso-pentane and cyclopentane. It has, however, become apparent that not all the requirements of foam technology are met when these hydrocarbon blowing agents are used. In particular, the insulating performance (low thermal conductivity) required for high-quality rigid foam applications is not usually attained.

The object of the present invention was, therefore, to improve the thermal conductivity of rigid polyurethane foams produced with the use of hydrocarbon blowing agents.

DESCRIPTION OF THE INVENTION

Surprisingly, the above object was achieved in a procedure whereby a specified polyether-polyol mixture is used as the polyol component. The hydrocarbon blowing agent is partially dissolved in the polyol component so that a polyolblowing agent emulsion is formed. The use of this specified polyolblowing agent emulsion according to the present invention resulted in a 10 to 15% lowering of the thermal conductivity in the rigid polyurethane foam (as compared with a rigid polyurethane foam in which the foaming agent is completely dissolved in the polyol).

The present invention, therefore, is directed to a process for producing isocyanate-based foams comprising reacting:

1) polyisocyanates with
2) one or more compounds with molecular weights of from 400 to 10,000 and having at least two hydrogen atoms active towards isocyanates in the presence of
3) hydrocarbons which are vaporizable under the foaming conditions as blowing agents,
4) optionally in the presence of one or more compounds with molecular weights of from 32 to 399 and having at least two hydrogen atoms capable of reacting with isocyanates, and
5) optionally in the presence of further foaming agents and auxiliary materials and additives generally known in the polyurethane art, wherein component 2) comprises a mixture of a) one or more nitrogen-free polyethers having at least two hydrogen atoms active towards isocyanates and which contain oxyethylene residues, and b) one or more polyethers having at least two hydrogen atoms active towards isocyanates and which are free of oxyethylene groups.

Preferably, component 2) contains 5 to 50% by weight, more preferably 10 to 20% by weight of polyether a) and 50 to 95% by weight, more preferably 80 to 90% by weight, of polyether b).

Preferably, the blowing agents are hydrocarbons having 3 to 7 carbon atoms. It is also preferred that the blowing agent be selected from the group consisting of n-pentane, isopentane, cyclopentane and mixtures thereof. Most preferably, the blowing agent is a mixture of one or more cycloalkanes and one or more straight or branched alkanes.

In another preferred embodiment, water, in a quantity of from 0.5 to 3.5% by weight, preferably 1 to 2.5% by weight, (based on the total weight of component 2)) is added as a co-blowing agent.

It is also preferred that in a preliminary reaction with excess polyisocyanate, the polyether component 2a) is converted to a prepolymer having an isocyanate group which is then reacted with the remaining components, with the formation of the foam.

Polyether component 2a) preferably has a functionality of at most 4 and polyether component 2b) preferably has a functionality of at least 4. Most preferably, polyether component 2a) is a polyether produced from trimethylolpropane and/or glycerol as starting material and polyether component 2b) is a polyether from a sucrose and/or sorbitol as starting material.

In one preferred embodiment, 5 to 40% by weight, preferably 10 to 20% by weight, of a polyester having at least two hydrogen atoms active towards isocyanates is added to the polyether mixture 2). Polyesters of phthalic and/or terephthalic acid with OH numbers of from 100 to 500, preferably 200 to 400, are particularly preferred for this purpose.

The advantages of the present invention include the following:

a) the major portion of the hydrocarbon blowing agent is as a rule dissolved in the polyol; this lowers the viscosity of the polyol constituents, which ensures mechanical workability;
b) a reduced thermal conductivity is attained, especially when using cyclopentane as the blowing agent; and
c) the preferred combination of polyether mixture with polyesters according to the present invention contributes to the long-term workability of the polyether/blowing agent mixture.

According to the invention the production of rigid polyurethane foams and/or the production of rigid polyisocyanurate foams is preferred. The production of isocyanate foams is well known in the art and is described, e.g. in the German published Patent Applications 1,694,142, 1,694,215 and 1,720,768 as well as in Kunststoff-Handbuch Band VII, Polyurethane, published by Vieweg and Höchtlen, Carl Hanser Verlag, Munich 1966 and in the edition of this book, published by G. Oertel, Carl Hanser Verlag, Munich and Vienna, 1983. Preferably, foamed materials having urethane and/or isocyanurate and/or allophanate and/or uretdione and/or urea and/or carbodiimide groups are produced.

Useful isocyanates for the production of the foams herein are known and include aliphatic, cycloaliphatic, araliphatic, aromatic or heterocyclic polyisocyanates as described, e.g. by W. Siefken in Justus Liebig's Annalen der Chemie, vol. 562 pp.75 to 136, for example those of the formula:

Q(NCO)

herein n is 2 to 4, preferably 2 and 3, and Q is an aliphatic hydrocarbon residue having 2 to 18, preferably 6 to 10 carbon atoms, a cycloaliphatic hydrocarbon residue having 4 to 15, preferably 5 to 10 carbon atoms, an aromatic hydrocarbon residue having 6 to 15, preferably, 6 to 13 carbon atoms or an araliphatic hydrocarbon residue having 8 to 15, preferably, 8 to 13 carbon atoms, e.g. polyisocyanates such as are described in German published Application 2,832,253, pp. 10 to 11. Generally, readily available polyisocyanates are particularly preferred, e.g. 2,4- and 2,6-toluylene diisocyanate as well as isomers of these in any mixture of proportions ("TDI"); polyphenyl polymethylene polyisocyanates, as produced through aniline-formaldehyde condensation and final treatment with phosgene ("crude MDI"); and polyisocyanates having carbodiimide groups, urethane groups, allophanate groups, isocyanurate groups, urea groups and/or biuret groups ("modified polyisocyanates"), and in particular such modified polyisocyanates as are derived from 2,4- and/or 2,6- toluylene diisocyanate or from 4,4'- and/or 2,4'-diphenylmethane diisocyanate.

Also necessary is the mixture of polyethers noted above. The individual polyethers have molecular weights of from 400 to 10,000 and have at least two hydrogen atoms capable of reacting with isocyanates. Preferred are polyethers having hydroxyl groups, especially those with a molecular weight of 1,000 to 6,000, preferably 2,000 to 6,000, which are generally known for the production of homogeneous and cell-forming polyurethanes and which are described e.g. in German published Patent Application 2,832,253, pp. 11–18. The oxyethylene residues contained in the nitrogen-free polyethers in accordance with component 2a) are formed by the addition of ethylene oxide (EO), optionally with the co-addition of other alkylene oxides such as propylene oxide, and can be situated at any point in the polyether molecule.

It is preferred that a proportion of from 5 to 40% by weight, preferably from 10 to 20% by weight, of a polyester having at least two hydrogen atoms active towards isocyanates, and preferably a polyester of phthalic and/or terephthalic acid with a OH number of from 100 to 500, preferably from 200 to 400, be added to the polyether mixture. It is most preferred that these polyesters contain hydroxyl groups.

The blowing agents useful herein are hydrocarbons which are vaporizable under the foaming conditions. Specific examples of useful blowing agents include propane, butane, n-pentane, isopentane, hexane, heptane, isooctane, cyclopentane, cyclopentene and the like. Preferred blowing agents are hydrocarbons having 3 to 7 carbon atoms. Preferably, they are selected from the group consisting of n-pentane, isopentane, cyclopentane, and mixtures thereof. These blowing agents are generally used in quantities of from 0.1 to 20% by weight, preferably from 0.2 to 15% by weight (based on the total weight of component 2)).

Other optional materials include compounds with molecular weights of from 32 to 399 and having at least two hydrogen atoms capable of reacting with isocyanates. Such compounds include compounds having hydroxyl groups and/or amino groups and/or thiol groups and or carboxyl groups, and, preferably, compounds having hydroxyl groups and/or amino groups, which serve as chain extending agents or cross-linking agents. These compounds generally contain from 2 to 8, preferably from 2 to 4 hydrogen atoms capable of reacting with isocyanates. Examples of useful compounds are described in the German published Patent Application 2,832,253, pages 19 to 20.

Other optional materials include blowing agents and auxiliary materials and additives generally known and used in the polyurethane art. Such materials include:

a) water and/or readily volatile organic substances as co-blowing agents;

b) catalysts in quantities of up to 10% by weight of component 2);

c) surface-active additives such as emulsifiers and foam stabilizers;

d) reaction inhibitors, e.g. acid reacting substances such as hydrochloric acid or organic acid haloides; cell regulators, such as paraffins or fatty alcohols or dimethylpolysiloxanes; stabilizers against ageing and weathering influences; plasticizers and fungistatic and bacteriostatic substances as well as fillers such as barium sulphate, kieselguhr, carbon black or whitening. These optional materials and additives to be used are described e.g. in German published Patent Application 2,732,292, pp. 21 to 24.

Further examples of surface-active additives and foam stabilizers to be used optionally according to the invention as well as cell regulators, reaction inhibitors, stabilizers, flame retardants, plasticizers, dyes, fillers, and fungistatic and bacteriostatic substances together with detailed information concerning the method of application and mode of action of these additives are given in Kunststoff-Handbuch Band VII, Polyurethane, published by Vieweg and Höchtlen, Carl Hanser Verlag, Munich 1966, pp. 103–113.

The isocyanate-based foams are produced by methods known in the art. Thus, they may be produced using the known one step process, the known pre-polymer process or the known semi-prepolymer process, often using mechanical equipment e.g. such as is described in U.S. Pat. No. 2,764,565. Detailed information concerning processing equipment which can be used according to the invention is given in Kunststoff-Handbuch Band VII, Polyurethane, published by Vieweg and Höchtlen, Carl Hanser Verlag, Munich 1966, pp. 121 to 205.

In producing polyurethane foams, an isocyanate index of about 90 to 130 is generally used. If the production of polyisocyanurate foams is intended, an isocyanate index of 130 to 500, preferably 150 to 400, is generally applied.

Cold-curing foamed materials can also be produced according to the invention (see, e.g., British Patent 1,162, 517 and German published Patent Application 2,153,086).

Rigid foamed materials can be produced by block foaming or by the well-known twin conveyer belt process.

The products of the present invention find application e.g. as insulating boards for roof insulation and as insulating layers in household appliances.

The invention is further illustrated but is not intended to be limited by the following examples in which all parts and percentages are by weight unless otherwise specified.

EXAMPLES

Example 1

Production of a rigid PUR (polyurethane) foam

A mixture was prepared from:
- 70 parts by weight of a sucrose/propylene oxide polyetherpolyol of hydroxyl number 450,
- 30 parts by weight of a glycerol/ethylene oxide polyetherpolyol of hydroxyl number 450,
- 2 parts by weight of water,
- 2 parts by weight of a silicone foam stabilizer (Tegostab ® B 8411 ), and
- 2 parts by weight of N,N-dimethylcyclohexylamine.

The isocyanate was a polymethylene poly(phenyl isocyanate) having an NCO (isocyanate) content 31.5% by weight.

100 parts by weight of the above mixture and 15 parts by weight of cyclopentane were intimately mixed at 20° C. using a high-speed mixer (4,000 revs. per min.). An emulsion of finely divided cyclopentane in polyol is formed. 115 parts by weight of this mixture was stirred with 131 parts by weight of the isocyanate until thoroughly mixed. The reaction mixture was poured into an open carton and foamed up.

The rigid PUR foam obtained had a mean cell diameter of 120 μm at a free foamed bulk density of 24 kg/m$^3$. The thermal conductivity measured according to Anacon at 24° C. was 0.020 W/Km.

Example 2 (Comparison)

Production of a rigid PUR foam

A mixture was prepared from:
- 70 parts by weight of a sucrose/propylene oxide polyetherpolyol of hydroxyl number 450,
- 30 parts by weight of a glycerol/propylene oxide polyetherpolyol of hydroxyl number 450,
- 2 parts by weight of water,
- 2 parts by weight of a silicone foam stabilizer (Tegostab ® B 8411), and
- 2.8 parts by weight of N,N-dimethylcyclohexylamine.

The isocyanate was the same isocyanate used in Example 1 and was a polymethylene poly(phenyl isocyanate) having an NCO (isocyanate) content 31.5% by weight.

100 parts by weight of the above mixture and 15 parts by weight of cyclopentane were intimately mixed at 20° C. using a high-speed mixer (4,000 revs. per min.). A homogeneous, clear solution of cyclopentane in polyol was formed. 115 parts by weight of this mixture was stirred with 131 parts by weight of the isocyanate component until thoroughly mixed. The reaction mixture was poured into an open carton and foamed up.

The rigid PUR foam obtained had a mean cell diameter of 250 μm at a free foamed bulk density of 24 kg/m$^3$. The thermal conductivity measured according to Anacon at 24° C. was 0.023 W/Km.

Example 3

Production of a rigid PUR (polyurethane) foam

A mixture was prepared from:
- 60 parts by weight of a sucrose/propylene oxide polyetherpolyol of hydroxyl number 450,
- 10 parts by weight of a phthalic acid-diethylene glycol ester of hydroxyl number 300,
- 30 parts by weight of a pentaerythritol/ethylene oxide polyether-polyol of hydroxyl number 500,
- 2 parts by weight of water,
- 2 parts by weight of a silicone foam stabilizer (Tegostab ® B 8426), and
- 1.8 parts by weight of N,N-dimethylcyclohexylamine.

The isocyanate was the same isocyanate used in Example 1.

100 parts by weight of the above mixture and 12 parts by weight of cyclopentane were intimately mixed at 20° C. using a high-speed mixer (4,000 revs. per min.). An emulsion of finely divided cyclopentane in polyol was formed. 112 parts by weight of this mixture was stirred with 132 parts by weight of the isocyanate until thoroughly mixed. The reaction mixture was poured into an open carton and foamed up.

The rigid PUR foam obtained had a mean cell diameter of 120 μm at a free foamed bulk density of 25 kg/m$^3$. The thermal conductivity measured according to Anacon at 24° C. was 0.020 W/Km.

Example 4

Production of a rigid PUR (polyurethane) foam

A mixture was prepared from:
- 60 parts by weight of a sorbitol/propylene oxide polyetherpolyol of hydroxyl number 450,
- 10 parts by weight of a phthalic acid-diethylene glycol ester of hydroxyl number 300,
- 30 parts by weight of a pentaerythritol/ethylene oxide polyether-polyol of hydroxyl number 500,
- 2 parts by weight of water,
- 2 parts by weight of a silicone foam stabilizer (Tegostab ® B 8426), and
- 1.8 parts by wt of N,N-dimethylcyclohexylamine.

The isocyanate was identical to the isocyanate used in Example 1.

100 parts by weight of the above mixture and 12 parts by weight of n-pentane were intimately mixed at 20° C. using a high-speed mixer (4,000 revs. per min.). An emulsion of finely divided n-pentane in polyol was formed. 112 parts by weight of this mixture was stirred with 132 parts by weight of the isocyanate component until thoroughly mixed. The reaction mixture was poured into an open carton and foamed up.

The rigid PUR foam obtained had a mean cell diameter of 120 μm at a free foamed bulk density of 25 kg/m$^3$. The thermal conductivity measured according to Anacon at 24° C. was 0.022 W/Km.

Example 5

Production of a rigid PUR (polyurethane) foam

A mixture was prepared from:
- 60 parts by weight of a sorbitol/propylene oxide polyetherpolyol of hydroxyl number 450, 10 parts by weight of a phthalic acid-diethylene glycol ester of hydroxyl number 300, 30 parts by weight of a pentaerythritol/ethylene oxide polyether-polyol of hydroxyl number 500, 2 parts by weight of water, 2 parts by weight of a silicone foam stabilizer (Tegostab® B 8426), and 1.8 parts by weight of N,N-dimethylcyclohexylamine.

The isocyanate was the same as used in Example 1.

100 parts by weight of the above mixture and 12 parts by weight of cyclopentane were intimately mixed at 20° C. using a high-speed mixer (4,000 revs. per min.). An emulsion of finely divided cyclopentane in polyol was formed. 112 parts by weight of this mixture was stirred with 132 parts by weight of the isocyanate component until thoroughly mixed. The reaction mixture was poured into an open carton and foamed up.

The rigid PUR foam obtained had a mean cell diameter of 220 $\mu$m at a free foamed bulk density of 25 kg/m$^3$. The thermal conductivity measured according to Anacon at 24° C. was 0.020 W/Km.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for producing isocyanate-based foams comprising reacting:
   1) one or more polyisocyanates with
   2) compounds having molecular weights of from 400 to 10,000 and having at least two hydrogen atoms active towards isocyanates in the presence of
   3) hydrocarbons which are vaporizable under the foaming conditions as blowing agents, and
   4) optionally in the presence of one or more compounds having a molecular weight of from 32 to 399 and having at least two hydrogen atoms capable of reacting with isocyanates, wherein component 2) comprises a mixture of a) one or more nitrogen-free polyethers having at least two hydrogen atoms active towards isocyanates and containing oxyethylene residues, and b) one or more polyethers having at least two hydrogen atoms active towards isocyanates and containing no oxyethylene groups, and wherein the amount of all components is such that the isocyanate index is from about 90 to 130.

2. The process of claim 1, wherein hydrocarbons having from 3 to 7 carbon atoms are used as component 3).

3. The process of claim 1, wherein said component 3) is selected from the group consisting of n-pentane, isopentane, cyclopentane and mixtures thereof.

4. The process of claim 1, wherein component 3) is a mixture of a cycloalkane and a straight or branched alkanes.

5. The process of claim 1, wherein water, in a quantity of from 0.5 to 3.5% by weight, based upon the total weight of component 2) is included as a co-blowing agent.

6. The process of claim 1, wherein the polyether component 2a) is reacted with an excess of said polyisocyanate to produce a prepolymer having isocyanate groups, with said prepolymer then being reacted with the remaining components, to form said foam.

7. The process of claim 1, wherein said polyether component 2a) has a functionality of at most 4 and said polyether component 2b) has a functionality of at least 4.

8. The process of claim 1, wherein said polyether component 2a) is a polyether produced from trimethylolpropane and/or glycerol as starting material and said polyether component 2b) is a polyether from sucrose and/or sorbitol as starting material.

9. The process of claim 1, wherein from 5 to 40% by weight, based on the total weight of component 2), of a polyester having at least two hydrogen atoms active towards isocyanates is added to the polyether mixture 2).

10. The process of claim 9, wherein said polyester is a polyester of phthalic and/or terephthalic acid with an OH number of from 100 to 500.

* * * * *